US012782177B2

(12) United States Patent
Arsalan et al.

(10) Patent No.: US 12,782,177 B2
(45) Date of Patent: Nov. 3, 2026

(54) COMPACT VENTURI WITH EMBEDDED DUAL MUTUALLY ORTHOGONAL RESONATOR (DMOR) SENSORS TO MEASURE MULTIPHASE FLOW RATES

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Muhammad Arsalan, Dhahran (SA); Muhammad Akram Karimi, Thuwal (SA); Zubair Akhter, Thuwal (SA); Atif Shamim, Thuwal (SA)

(73) Assignees: SAUDI ARABIAN OIL COMPANY, Dhahran (SA); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 285 days.

(21) Appl. No.: 18/605,609

(22) Filed: Mar. 14, 2024

(65) Prior Publication Data

US 2025/0290779 A1 Sep. 18, 2025

(51) Int. Cl.
*G01F 1/44* (2006.01)
*E21B 7/04* (2006.01)
(Continued)

(52) U.S. Cl.
CPC ................ *G01F 1/44* (2013.01); *E21B 21/08* (2013.01); *G01F 1/74* (2013.01); *E21B 7/046* (2013.01)

(58) Field of Classification Search
CPC ... E21B 7/046; G01F 1/44; G01F 1/40; G01F 1/42; G01F 1/74
See application file for complete search history.

(56) References Cited

U.S. PATENT DOCUMENTS 6,915,707 B2 7/2005 Nyfors et al.
7,107,860 B2 * 9/2006 Jones ........................ G01F 1/44 73/861.63
(Continued)

FOREIGN PATENT DOCUMENTS

CA 2964381 C * 6/2019 ............. E21B 43/14
EP 1337811 A1 8/2003
(Continued)

OTHER PUBLICATIONS

Surface Multiphase Flowmeter; retrieved from https://www.slb.com/reservoir-characterization/reservoir-testing/surface-testing/surface-multiphase-flowmetering/vx-spectra-surface-multiphase-flowmeter.
(Continued)

*Primary Examiner* — Andre J Allen
(74) *Attorney, Agent, or Firm* — Vorys, Sater, Seymour and Pease LLP

(57) ABSTRACT

A Waventuri flowmeter includes a Venturi flowmeter with a multiphase fraction measurement device incorporated therein. The Waventuri flowmeter includes an inlet for receiving a wellbore fluid into the flowmeter, the inlet defining an inlet diameter and an outlet for discharging the wellbore fluid from the flowmeter, the outlet defining an outlet diameter. A flow path extends between the inlet and the outlet and includes a converging section downstream of the inlet and a diverging section downstream of the converging section. At least one sensor is operable to detect a parameter indicative of pressures of the wellbore fluid at the inlet and a throat between the converging and diverging sections. First and second permittivity sensors extend axially along the diverging and converging sections, respectively. The first and second permittivity sensors are operable to measure parameters indicative of multiphase volume frac-
(Continued)

tions of the wellbore fluid within the diverging and converging sections.

20 Claims, 6 Drawing Sheets

(51) Int. Cl.
*E21B 21/08* (2006.01)
*G01F 1/74* (2006.01)

(56) References Cited

U.S. PATENT DOCUMENTS

| | | | | |
|---|---|---|---|---|
| 7,293,471 | B2 | 11/2007 | Lund Bo et al. | |
| 8,322,228 | B2 * | 12/2012 | Xie | G01F 1/36 73/861.04 |
| 8,570,050 | B2 | 10/2013 | Nyfors | |
| 9,588,071 | B2 | 3/2017 | Nyfors | |
| 10,208,574 | B2 * | 2/2019 | Least | E21B 43/086 |
| 10,648,841 | B1 * | 5/2020 | Arsalan | G01N 22/04 |
| 12,405,140 | B1 * | 9/2025 | Altowairqi | G01F 1/50 |
| 2011/0185805 | A1 * | 8/2011 | Roux | G01F 1/44 73/861.63 |
| 2021/0270989 | A1 | 9/2021 | Zhan et al. | |
| 2022/0090947 | A1 * | 3/2022 | Gamber | G01F 1/44 |
| 2023/0105634 | A1 * | 4/2023 | Brown | G01F 1/44 73/861.04 |
| 2025/0116541 | A1 * | 4/2025 | Alrabaei | G01F 1/44 |

FOREIGN PATENT DOCUMENTS

| | | | |
|---|---|---|---|
| EP | 1926991 | A1 | 6/2008 |
| WO | 2020185453 | A1 | 9/2020 |

OTHER PUBLICATIONS

Haimo, Multiphase Flow Meters (MPFM), retrieved from http://www.haimotech.com/Products-and-Services/mpfm/.

Abbon 3PM Twinflow; retrieved from https://abbon.com/abbon3pm/.

Matallah HF, et al., Field performance evaluation of a non-radioactive MPFM in challenging conditions in the Middle East, 35th International North Sea Flow Measurement Workshop Oct. 24-26, 2017.

Flow Solutions Brochure by Saher; retrieved from https://saherflow.com/wp-content/uploads/2022/01/saher_services_brochure.pdf.

Xiaoguang Lin, et al., Measurement of the flow rate of oil and water using microwave and Venturi sensors with end-to-end dual convolutional neural network, Measurement: Sensors, vols. 10-12, 2020.

PCT International Search Report & Written Opinion pertaining to International Application No. PCT/US2025/019705; Date of Mailing: May 27, 2025.

* cited by examiner

COMPACT VENTURI WITH EMBEDDED DUAL MUTUALLY ORTHOGONAL RESONATOR (DMOR) SENSORS TO MEASURE MULTIPHASE FLOW RATES

FIELD OF THE DISCLOSURE

The present disclosure relates generally to monitoring fluid flow in conduits and, more particularly, to multiphase flow meters employing sensors, and analysis of data provided by the sensors to interpret complex fluid flows such as hydrocarbon mixtures flowing from a subterranean wellbore.

BACKGROUND OF THE DISCLOSURE

Hydrocarbon resources are often located in geologic formations that lie tens of thousands of feet below the earth's surface. In order to extract the hydrocarbon fluid, wellbores may be drilled through the geologic formations to access subterranean hydrocarbon reservoirs. Accurate measurement of hydrocarbon mixtures flowing out of a wellbore (e.g., oil, gas, water, and debris) may facilitate downstream processes such as separation of the hydrocarbon mixtures into single phase components.

One type of multiphase flow meter (MPFM) that may be employed to measure the flow within or from a wellbore includes a differential pressure device, e.g., a Venturi or orifice plate. A pressure drop measured in the differential pressure device may be related to a flow rate if the density of the fluid under test is known. An effective density of multiphase wellbore fluids may be accurately estimated if an exact fraction of each individual phase, e.g. oil, gas and water, is known. Thus, devices employing technologies such as infrared, microwaves, ultrasonics, capacitance/conductance, gamma rays, etc., may be employed to take multiphase fraction measurements of wellbore fluids, which may be used in conjunction with the measurements from the differential pressure device to accurately determine flow characteristics of the complex multiphase flows.

Connecting a multiphase fraction measurement device in series with a differential pressure device may provide adequate flow measurements in some instances. However, this arrangement may be relatively bulky and difficult to implement in applications where space is limited, e.g., downhole applications. In many applications, this arrangement may only provide accurate results for a limited range of flow conditions. For example, a flow meter may be validated for a specific range of water cut and gas volume fractions. Accordingly, a compact multiphase flow meter operable over a wide range of flow conditions would be useful in many different hydrocarbon flow measurement applications.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Embodiments of the present disclosure describe "Waventuri" flowmeters, which, as described herein below, include Venturi flowmeters with a multiphase fraction measurement device incorporated therein. According to an embodiment consistent with the present disclosure, a flowmeter includes an inlet for receiving a wellbore fluid into the flowmeter, the inlet defining an inlet diameter and an outlet for discharging the wellbore fluid from the flowmeter, the outlet defining an outlet diameter. The flowmeter further includes a flow path extending between the inlet and the outlet along a longitudinal flow axis, the flow path including a converging section downstream of the inlet and narrowing from the inlet diameter to a throat diameter, and a diverging section downstream of the converging section and widening from the throat diameter to the outlet diameter. At least one sensor is operable to detect a parameter indicative of the pressures of the wellbore fluid at the inlet diameter and at the throat diameter and first and second permittivity sensors extend axially along the diverging and converging sections, respectively. The first and second permittivity sensors are operable to measure parameters indicative of multiphase volume fractions of the wellbore fluid within the diverging and converging sections.

According to another embodiment consistent with the present disclosure, a wellbore system includes a wellbore conduit fluidly coupled to a wellbore and operable to receive a wellbore fluid therein and a flowmeter fluidly coupled to the wellbore conduit. The flowmeter includes an inlet for receiving the wellbore fluid into the flowmeter from the wellbore conduit, the inlet defining an inlet diameter and an outlet for discharging the wellbore fluid from the flowmeter into the wellbore conduit, the outlet defining an outlet diameter. A flow path extends between the inlet and the outlet along a longitudinal flow axis, the flow path including a converging section downstream of the inlet and narrowing from the inlet diameter to a throat diameter, and a diverging section downstream of the converging section and widening from the throat diameter to the outlet diameter. At least one sensor is operable to detect a parameter indicative of the pressures of the wellbore fluid at the inlet diameter and at the throat diameter, and first and second permittivity sensors extend axially along the diverging and converging sections, respectively. The first and second permittivity sensors are operable to measure parameters indicative of multiphase volume fractions of the wellbore fluid within the diverging and converging sections.

According to still another embodiment consistent with the present disclosure, a method for measuring a flow of a wellbore fluid includes (a) receiving the wellbore fluid at an inlet of a flowmeter, (b) flowing the wellbore fluid through a flow path extending along a longitudinal flow axis through the flowmeter, the flow path including a converging section downstream of the inlet and narrowing from an inlet diameter to a throat diameter, and a diverging section downstream of the converging section and widening from the throat diameter to an outlet diameter, (c) measuring parameters indicative of multiphase volume fractions of the wellbore fluid within the diverging and converging sections with first and second permittivity sensors extending axially along the diverging and converging sections, (d) comparing the parameters indicative of multiphase volume fractions to predetermined values tabulated within look-up tables to determine a multiphase volume fraction and (e) determining a flow rate for the wellbore fluid from the multiphase volume fraction.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
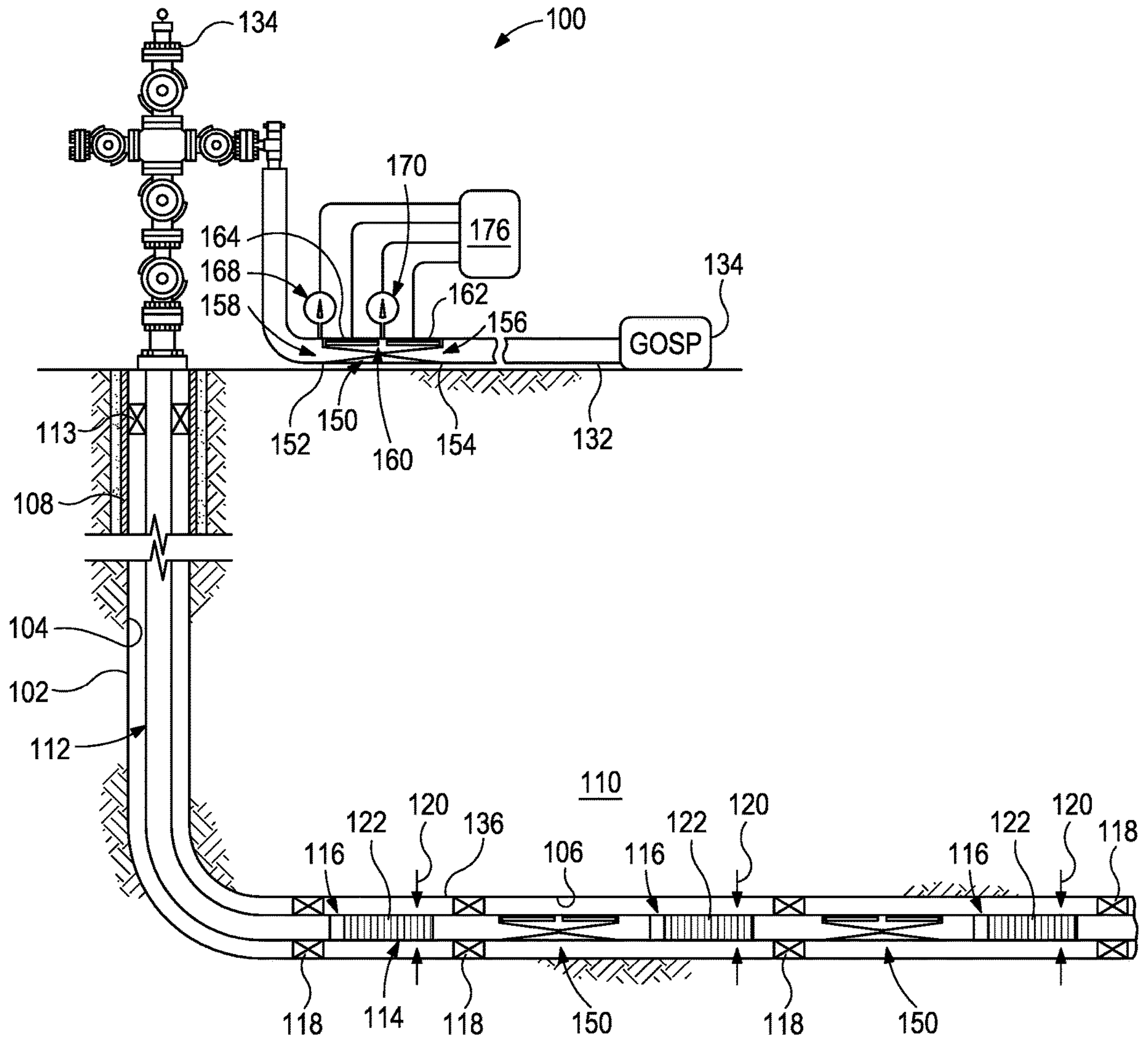
FIG. 1 is a schematic diagram of a wellbore system including a Waventuri flowmeter with a multiphase fraction measurement device integrated therein in accordance with one or more aspects of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a Venturi flowmeter with a multiphase fraction measurement device integrated therein, herein referred to as "Waventuri". The multiphase fraction measurement device may include a microwave resonance sensor extending axially along, e.g., axially overlapping, converging and diverging portions of the flowmeter. The microwave resonance sensors may be spirally arranged around an outer surface of the diverging and converging portions, and the diverging and converging portions may be arranged as an inverted-style Venturi such that a wall thickness between the microwave resonance sensors and a flow path through the flowmeter varies axially along the diverging and converging portions. The spirally arranged microwave resonance sensors may include connectors for microwave feed lines defined at an edge and mid portion of the flowmeters such that a monotonous response over selected ranges from which a unique solution for a gas volume fraction of a fluid under test may be determined.

FIG. 1 is a schematic diagram of an example wellbore system 100 that may employ one or more of the principles of the present disclosure. As depicted, the wellbore system 100 includes a wellbore 102 that extends through various earth strata and has a substantially vertical section 104 that transitions into a substantially horizontal section 106. A portion of the vertical section 104 may have a string of casing 108 cemented therein, and the horizontal section 106 may extend through a hydrocarbon bearing subterranean formation 110. In some embodiments, the horizontal section 106 may be uncompleted and otherwise characterized as an "open-hole" section of the wellbore 102. In other embodiments, however, the casing 108 may extend into the horizontal section 106, without departing from the scope of the disclosure.

A string of production tubing 112 may be positioned within the wellbore 102 and extend from a well surface location "S," such as the Earth's surface. The production tubing 112 provides a conduit for fluids extracted from the formation 110 to travel to the well surface location S for production. A hanger 113 is provided between the production tubing 112 and the casing 108. The hanger 113 may be carried by the production tubing 112 and may include radially expandable teeth or other structures that bite into the casing 108 and thereby hold the production tubing 112 in place within the wellbore 102.

A completion string 114 may be coupled to or otherwise form part of the lower end of the production tubing 112 and arranged within the horizontal section 106. The completion string 114 may be configured to divide the wellbore 102 into various production intervals or "zones" adjacent the subterranean formation 110. To accomplish this, as depicted, the completion string 114 may include a plurality of inflow control devices or "ICDs" 116 axially offset from each other along portions of the production tubing 112. In some embodiments, each inflow control device 116 may be positioned between a pair of wellbore packers 118 that provides a fluid seal between the completion string 114 and the inner wall of the wellbore 102, and thereby defining discrete production intervals or zones.

The inflow control devices 116 are operable to selectively regulate the flow of fluids 120 into the completion string 114 and, therefore, into the production tubing 112. In the illustrated embodiment, each inflow control device 116 includes a sand control screen assembly 122 that filters particulate matter out of the formation fluids 120 originating from the formation 110 such that particulates and other fines are not produced to the well surface location. After passing through the sand control screen assembly 122, the inflow control devices 116 may be operable to regulate the flow of the fluids 120 into the completion string 114. Regulating the flow of fluids 120 into the completion string 114 from each production interval may be advantageous in preventing water coning or gas coning in the subterranean formation 110. Other uses for flow regulation include, but are not limited to, balancing production from multiple production intervals, minimizing production of undesired fluids, maximizing production of desired fluids, etc.

As used herein, the term “fluid” or “fluids” (e.g., the fluids 120) includes liquids, gases, hydrocarbons, multi-phase fluids, mixtures of two of more fluids, water and fluids injected from the surface, such as water. Additionally, references to “water” includes fresh water but should also be construed to also include water-based fluids; e.g., brine or salt water. In accordance with embodiments of the present disclosure, the inflow control devices 116 may have a number of alternative structural features that provide selective operation and controlled fluid flow therethrough.

It should be noted that even though FIG. 1 depicts the inflow control devices 116 as being arranged in an open-hole portion of the wellbore 102, embodiments are contemplated herein where one or more of the inflow control devices 116 is arranged within cased portions of the wellbore 102. Also, even though FIG. 1 depicts a single inflow control device 116 arranged in each production interval, any number of inflow control devices 116 may be deployed within a particular production interval without departing from the scope of the disclosure. In addition, even though FIG. 1 depicts multiple production intervals separated by the packers 118, any number of production intervals with a corresponding number of packers 118 may be used. In other embodiments, the packers 118 may be entirely omitted from the completion interval, without departing from the scope of the disclosure.

Furthermore, while FIG. 1 depicts the inflow control devices 116 as being arranged in the horizontal section 106 of the wellbore 102, the inflow control devices 116 are equally well suited for use in the vertical section 104 or portions of the wellbore 102 that are deviated, slanted, multilateral, or any combination thereof. The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the wellbore 102.

A wellhead 130 is installed at the surface location “S.” The wellhead 130 generally provides a suspension point for the string of casing 108 and the production tubing 112 and also provides pressure control for the wellbore 102. The wellhead 130 may include a system of valves and adaptors that distribute wellbore fluids 120 produced through the production tubing 112 to an appropriate destination. For example, wellbore fluids 120 may be directed from the production tubing 112 through the wellhead 130 to a surface conduit 132, which may extend to a gas-oil separation plant (GOSP) 134, a collection tank, a pipeline or another downstream destination.

In accordance with certain embodiments of the present disclosure, a Waventuri flowmeter 150 may be defined within the surface conduit 132 for monitoring the wellbore fluid 120 exiting the wellbore 102. The flowmeter 150 may include an inlet 152 for receiving a multiphase flow from the wellbore 102 and an outlet 154 defined between the wellhead 130 and the GOSP 134 or other downstream destination. The flowmeter 150 may include a diverging portion 156 and a converging portion 158 defined between the inlet 152 and the outlet 154. As described in greater detail below, an integrated multiphase fraction measurement device 160 includes non-invasive permittivity sensors to measure a dielectric permittivity, or another characteristic of a fluid flowing through the flowmeter 150 indicative of a multiphase fraction of the fluid. For example, the permittivity sensors may include first and second microwave resonance sensors 162, 164 that extend axially along the diverting and converging portions 158, 156, respectively.

The flowmeter 150 may include one or more inlet gauges or sensors 168 and one or more throat gauges or sensors 170 operable to detect a parameter indicative of a pressure of the wellbore fluid 120 within the flowmeter 150. The inlet sensors 168 may monitor the unrestricted flow of the wellbore fluid 120 into the inlet 152 while the throat sensors 170 may monitor a restricted flow of the wellbore fluid 120 between the converging and diverging portions 158, 156. The inlet sensor 168, the throat sensor 170 and the first and second microwave resonance sensors 162, 164 may each be communicably coupled to a controller 176 operable to determine a flow rate and/or other characteristics of the wellbore fluid 120 passing through the flowmeter 150.

As illustrated in FIG. 1, the controller 176 may be provided at the surface location “S” where an operator may monitor data provided by the sensors 168, 170 and the microwave resonance sensors 162, 164. In other embodiments, the controller 176 may be located downhole or at other available locations. In some embodiments, the controller 176 may be a computer-based system that may include a processor, a memory storage device, and programs and instructions, accessible to the processor for executing the instructions utilizing the data stored in the memory storage device. In some embodiments, the controller 176 may also include manual controls and visual displays that may be manipulated and monitored by an operator to ascertain flow characteristics of the wellbore fluid 120 passing through the surface conduit 132.

In accordance with other aspects of the disclosure, one or more Waventuri flowmeters 150 including integrated multiphase fraction measurement devices 160 may be provided at select downhole locations. For example, as illustrated in FIG. 1, flowmeters 150 may be provided within the completion string 114 between the inflow control devices 116 to monitor the wellbore fluids 120 entering the wellbore 102 from one or more of the wellbore intervals.

Figure 2A:
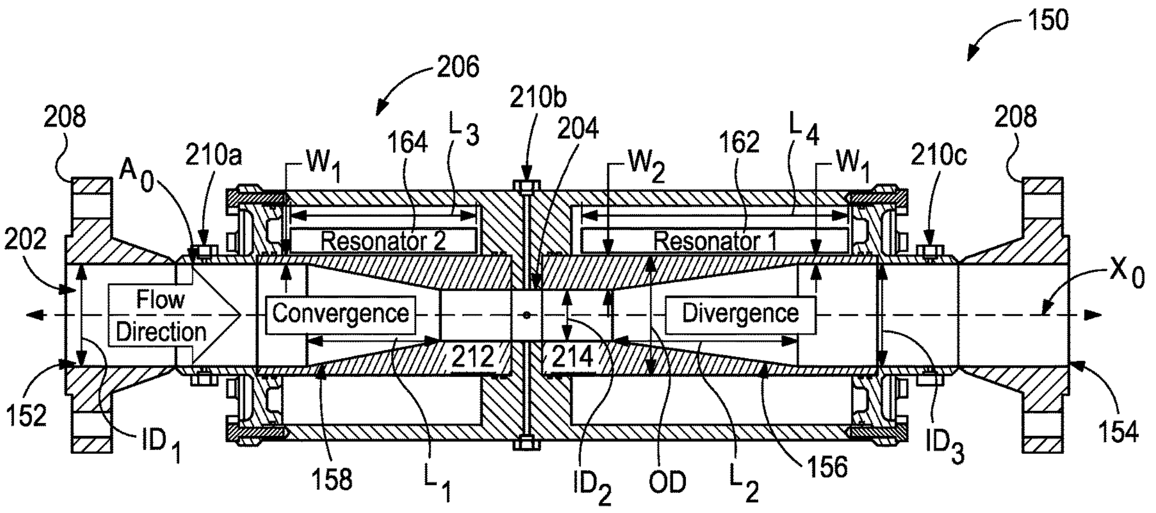
FIG. 2A is an enlarged, partial cross-sectional side view of the flowmeter of FIG. 1 illustrating including first and second microwave resonance sensors extending axially along diverging and converging portions of the Waventuri flowmeter.

Referring to FIG. 2A, the flowmeter 150 is illustrated in cross-section illustrating a flow path 202 extending between the inlet 152 and the outlet 154. The flow path 202 extends along a longitudinal axis $X_0$ through the converging portion 158 and the diverging portion 156 in the direction of arrow $A_0$. The flow path 202 defines a first or inlet diameter $ID_1$ at the inlet 152, which may be equivalent to an inner diameter of the surface conduit 132 (FIG. 1), completion string 114 or another conduit. The flow path 202 converges through the converging portion 158 to a second or throat diameter $ID_2$ at a throat 204 of the flowmeter 150. From the throat 204, the flow path 202 diverges through the diverging portion 156 to a third or outlet diameter $ID_3$ at the outlet 154. In some embodiments, the outlet diameter $ID_3$ may be equivalent to the inlet diameter $ID_1$, and in other embodiments, the outlet diameter $ID_3$ may be greater or less than the inlet diameter $ID_1$.

The flowmeter 150 includes an outer housing 206, which may include couplings (or flanges for top-surface connections) 208 at the inlet 152 and outlet 154 for coupling the flowmeter to the surface conduit 132 (FIG. 1), completion string 114 or another conduit. The outer housing 206 includes a plurality of pressure ports 210*a*, 210*b*, 210*c* (collectively or generally pressure ports 210) extending from an exterior of the flowmeter 150 to the flow path 202. A first pressure port 210*a* upstream of the converging portion 158 may be coupled to the inlet sensor 168 (FIG. 1) and a second pressure port 212*b* between the converging and diverting portions 158, 156 may be coupled to the throat sensor 170 (FIG. 1). In some embodiments, a third pressure port 210*c* downstream of the diverging portion 156 may be coupled to an outlet sensor (not shown). It is also contemplated to include a differential pressure transducer between pressure ports 210*a* and 210*b* and a similar differential pressure transducer between ports 210*b* and 210*c*.

In the embodiment illustrated in FIG. 2A, individual inserts 212 and 214 may be provided within the outer housing 206 to define the converging and diverting portions 158, 156. The inserts 212, 214 may be constructed of a dielectric material such as polyetheretherketone (PEEK) or another polymer. In other embodiments, PEEK inserts 212, 214 may be combined into a single piece as well (see, e.g., FIG. 2B). Additive manufacturing techniques such as 3D printing may be employed to construct the dielectric inserts. The inserts 212, 214 may be constructed with a generally uniform outer diameter OD, which may be about 4 inches (102 mm) in some embodiments. The inner diameters of the inserts 212, 214 may vary between the inlet and outlet diameters $ID_1$, $ID_3$ and the throat diameter $ID_2$ of the flow path 202, which may be about 2 inches (51 mm) in some embodiments. Thus, a first wall thickness $W_1$ may be defined at axially outward ends of the inserts 212, 214 and a second wall thickness $W_2$ may be defined at axially inner ends of the inserts 212, 214. In some embodiments, the first wall thickness may be about 0.43 inches (11 mm) the second wall thickness $W_2$ may be about 1.42 inches (36 mm).

The first and second microwave resonance sensors 162, 164 are disposed within the outer housing 206 such that the microwave resonance sensors 162, 164 extend axially along the diverting and converging portions 156, 158, respectively. Thus, the first and second microwave resonance sensors 162, 164 may interact with a fluid, e.g., a wellbore fluid 120 (FIG. 1), flowing through the flow path 202 through a varying wall thickness. This variation modulates the interaction of electromagnetic (EM) waves generated by the microwave resonance sensors 162, 164 with the multiphase fluid flowing through the flow path 202. For example, the regions where the inner diameter $D_1$ is relatively large at outer axial ends of the inserts 212, 214 are more sensitive to the EM waves than the regions where the inner diameter $D_2$ is relatively small. As illustrated in FIG. 2A, an axial length $L_1$ of the converging section 158 may be different, e.g., shorter, than an axial length $L_2$ of the diverging section 156. Similarly an axial length $L_3$ of the second microwave resonance sensor 164 within the converging section 158 may be shorter than an axial length $L_4$ of the first microwave resonance sensor 162 extending along the diverging section 156. A microwave resonator's resonance frequency is inversely proportional to its physical length, and thus the first microwave resonance sensor 162 may be referred to as the "low" frequency resonator and the second microwave resonance sensor 164 may be referred to as the "high" frequency resonator. Thus, a slope of the converging section 158 may be greater than a slope of the diverging section 156, and by using, two resonators 162, 164 with different physical lengths $L_4$, $L_3$, the dielectric properties of the multiphase fluid 120 (FIG. 1) within the flow path 202 may be detected at two different frequency bands. Detecting the dielectric properties at different frequency bands may facilitate calculating the water cut (WC) and Gas Volume Fraction (GVF) from microwave sensor parameters such as a resonant frequency and a quality factor as described in greater detail below. These variations allow for varied interactions of the EM waves with the fluid flowing through the flow path 202, which facilitates an accurate estimate of the phase fractions of the fluid.

Figure 2B:
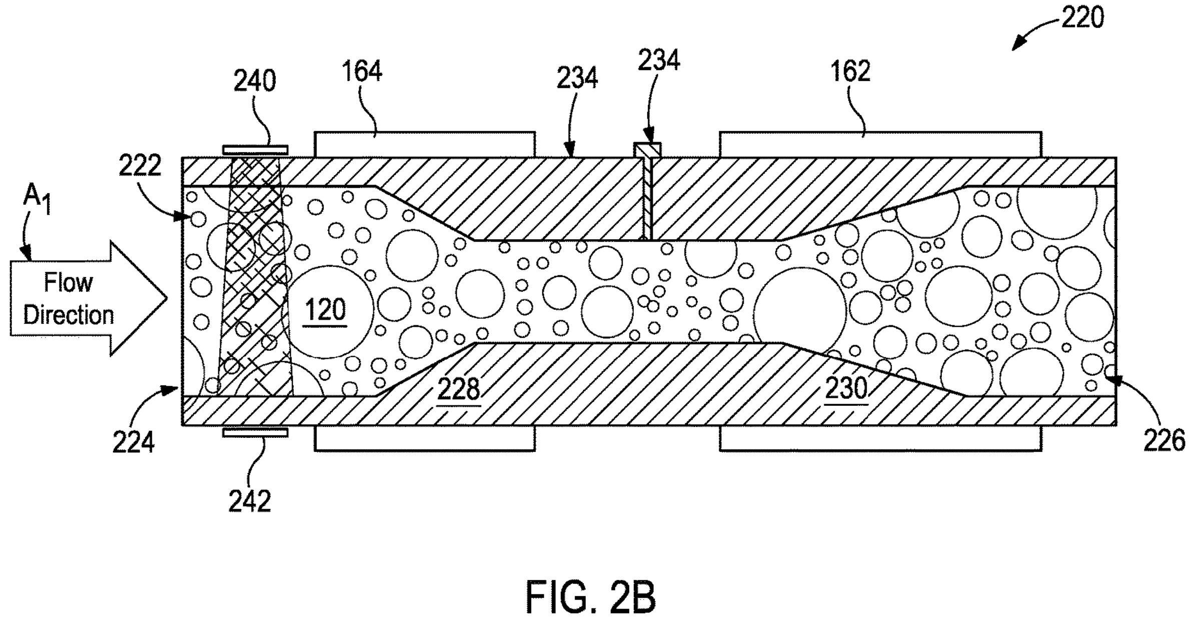
FIG. 2B is a partial, cross-sectional view of an alternate embodiment of a Waventuri flowmeter including an X-ray source and an associated detector array, coupled with a fluid carrying tube.

Referring now to FIG. 2B, an alternate embodiment of a Waventuri flowmeter 220 is illustrated in cross-section. The a flow path 222 for a multiphase fluid 120 extends between an inlet 224 and an outlet 226 through a converging portion 228 and a diverging portion 230 in the direction of arrow $A_1$. The converging portion 228 and the diverging portion 230 may be defined within a single piece dielectric insert 232 with a pressure port 234 defined between the converging and diverging portions 228, 230. The resonators 162, 164 may supported within an outer housing (not shown) to extend axially along the converging and diverging portions 228, 230 similar to the flowmeter 150 (FIG. 2A) described above.

An X-ray source 240 may be provided on a first circumferential side of the flow path 222 and an X-ray detector array 242 may be provided on a circumferentially opposite side of the flow path 222. The X-ray source 240 may include any suitable single or multiple energy level source to expose the wellbore fluid 120 to X-ray radiation. The X-ray source 240 and the X-ray detector array 242 may be operably coupled to the controller 176 (FIG. 1). The multiphase fluid 120 within the flow path 222 may be exposed to X-ray radiation 244 provided by the X-ray source 240, and the X-ray radiation 244 may be measured by the X-ray detector array 242. The measured radiation may be compared and correlated to density absorption characteristics for the multiphase fluid 120, and a Gas Volume Fraction (GVF) of the multiphase fluid may thereby be estimated.

In some embodiments, the X-ray source 240 and X-ray detector array 242 may be strategically positioned on opposite circumferential sides of the flow path 222 such that a first portion of the X-ray radiation passes through the wellbore fluid 120 in the flow path 222 and a second portion of the X-ray radiation passes directly from the source 240 to the detector array 242. For example, the source 240 and detector array 242 may extend laterally across the flow path 222 (to expose the wellbore fluid 120 to the X-ray radiation), and may further extend laterally beyond the diverging portion 228 (to permit a portion of the X-ray radiation to pass directly between the source 240 and the detector 242. This arrangement may facilitate calibrating out variations of source intensity due to variable operating conditions.

Figure 3:
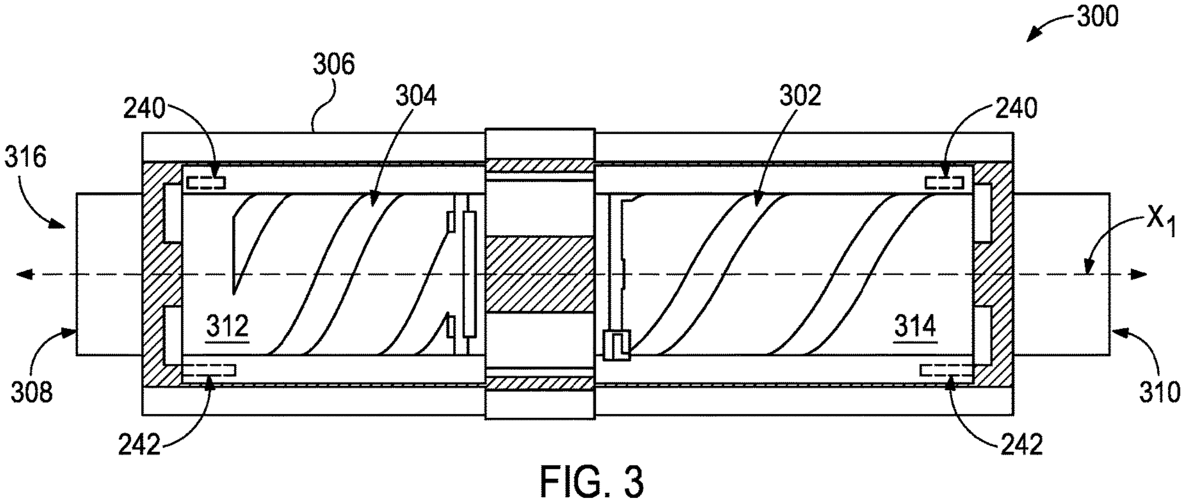
FIG. 3 is a partial, cross-sectional side view of an alternate embodiment of a Waventuri flowmeter for use in the wellbore system of FIG. 1, the Waventuri flowmeter including first and second microwave resonance sensors arranged in a spiraling configuration around diverging and converging portions of the Waventuri flowmeter and x-ray sources and detector arrays integrated with either the converging and/or diverging portion.

Referring now to FIG. 3, an alternate embodiment of a Waventuri flowmeter 300 including first and second microwave resonance sensors 302, 304 arranged in a spiraling configuration is illustrated. The flowmeter 300 includes an outer housing 306 defining an inlet 308 and an outlet 310. The outer housing 306 may receive inserts 312, 314 therein such that an interior flow path 316 is defined between the inlet 308 and the outlet 310. The interior flow 316 path extends along a longitudinal axis $X_1$, and includes a converging section 402 (FIG. 4B) defined within the insert 312 and a diverging section 404 (FIG. 4B) defined within the insert 314. A throat 318 of the interior flow path is defined within the outer housing 306 between the inserts 312, 314. Similar to the inserts 212, 214 (FIG. 2A) described above, the inserts 312, 314 may be constructed of a dielectric material such as PEEK with manufacturing processes such as 3D printing. The first and second microwave resonance sensors 302, 304 may be installed or 3D printed onto the exterior of the inserts 214. Thus, when the inserts 312, 314 are received in the outer housing 306, the first and second microwave resonance sensors 302, 304 are disposed radially between the dielectric inserts 212, 214 and the outer housing 306. In some embodiments as described above, the inserts 312, 314 may be combined into a single piece insert without departing from the scope of the disclosure.

Also, an X-ray source 240 and an associated X-ray detector array 242 may be positioned around the flow path 316 at on one or both of the inserts 312, 314. Thus, one or both of the converging section 402 (FIG. 4B) and diverging section 404 (FIG. 4B) may be associated with measurements of X-ray radiation passing through the flow path 316.

Figure 4A:
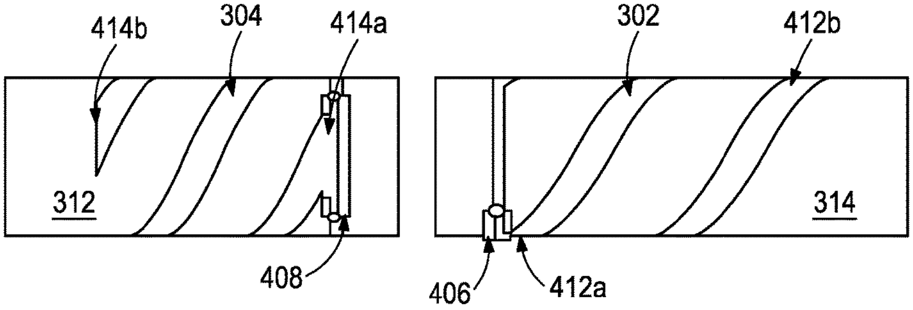
FIGS. 4A and 4B are side view and cross-sectional side views, respectively, of inserts defining the diverging and converging portions of FIG. 3 with the first and second microwave resonance sensors of FIG. 2A installed thereon.
Figure 4B:
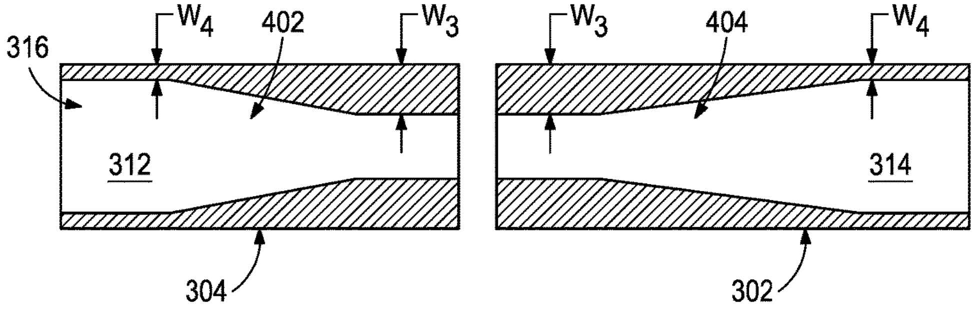

Referring to FIGS. 4A and 4B, the inserts 312, 314 are illustrated including the first and second microwave resonance sensors 302, 304 installed thereon. As described above, in some embodiments, a combined single piece insert may be provided in place of the individual inserts 312, 314. The microwave resonance sensors 302 and 304 extend axially along and around the converging and diverging sections 402, 404 of the flow path 316 in a spiral or helical configuration. The microwave resonance sensors 302 and 304 may include signal and ground T-resonators arranged as dual mutually orthogonal resonance (DMOR) sensors in a helical configuration. The helical configuration may enhance coupling of EM fields generated by the microwave resonance sensors 302 and 304 with a fluid flowing through the flow path 316. A helix of each of the microwave resonance sensors 302, 304 may be rotationally offset from the helix of the other microwave resonance sensor 302, 304.

The first microwave resonance sensor 302 includes a connector 406 and the second microwave resonance sensor 304 includes a connector 408. The connectors are positioned at feed ends 412*a*, 414*a* of the microwave resonance sensors 302, 304, which extend to open ends 412*b*, 414*b* opposite the feed ends 412*a*, 414*a*. The connectors 406, 408 are operable to couple the microwave resonance sensors 302, 304 to feedlines (not shown) for feeding microwave energy to the sensors 302, 304 and for communicating resonance sensor measurements to the controller 176 (FIG. 1). In the embodiment illustrated in FIGS. 3, 4A and 4B, the connectors 406, 408 are both positioned feeding the microwave resonance sensors 302, 304 from a mid-portion of the flowmeter 300 (FIG. 3) near the throat 318 where a wall thickness $W_3$ of the inserts 312, 314 is greatest. An intensity of the EM waves generated by the microwave resonance sensors 302, 304 vary as a function of the distance from the feed ends 412*a*, 414*a*, and thus, positioning the feed ends 412*a*, 414*a* adjacent the greatest wall thickness $W_3$ may result in peculiar interaction of the EM waves with the fluid in the flow path 316. Similarly, at the free ends 412*b*, 414*b* where fields generated by the microwave resonance sensors 302, 304 may be loosely bound, e.g., more fringing fields than at the feed ends 412*a*, 412*b*, where a wall thickness $W_4$ may be different, the coupling of the EM fields with the multiphase fluid could be different. In other embodiments, the feed ends of microwave resonance sensors may be positioned in alternate locations as described in greater detail with reference to FIGS. 5, 6A and 6B.

Figure 5:
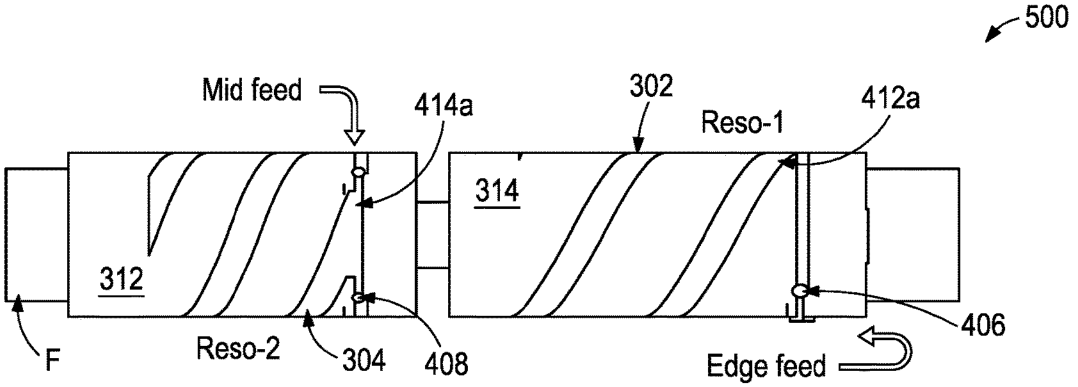
FIG. 5 is a schematic view of alternate embodiments of inserts for use in the flowmeter of FIG. 3 illustrating connectors for microwave feedlines disposed at an edge and mid portion of the flowmeter.

Referring now to FIG. 5, schematic view of Waventuri flowmeter 500 is illustrated with an alternate arrangement of the microwave resonance sensors 302, 304 on the dielectric inserts 312, 314. In the arrangement of FIG. 5, the connector 406 and the feed end 412*a* of the first microwave resonance sensor 302 are arranged at a longitudinal edge of the flowmeter 500, where the wall thickness is $W_4$ (FIG. 4B) may be at a minimum. The connector 408 and the feed end 414*a* of the second microwave resonance sensor 304 are arranged a longitudinal midsection of the flowmeter 500 where the wall thickness is $W_3$ (FIG. 4B) may be greater as described above. The first microwave resonance sensor 302 may be described as "edge fed" since the feed end 412*a* would generally be disposed at an edge of the flowmeter 500 and the second microwave resonance sensor 304 may be described as "mid-fed" since the feed end 414*a* would be generally disposed at the mid-portion of the flowmeter 500. It has been determined that this arrangement where one of the microwave resonance sensors 302, 304 is edge fed and the other microwave resonance sensor 302, 304 is mid-fed modulates the interaction of EM waves generated by the microwave resonance sensors 302, 304 with a multiphase fluid "F" (e.g., multiphase fluid 120 described above) flowing through the inserts 312, 314 such that a unique solution for a multiphase volume fraction may be determined from resonance sensor measurements taken by the microwave resonance sensors 302, 304. In other embodiments, the edge feed and mid-feed locations can also be interchanged with respect to convergence and divergence section (FIG. 2) of the Waventuri flow meter 500. For example, the connectors 406, 408 could both be positioned on opposite ends of the respective inserts 314, 312 such that the first microwave resonance sensor 302 may be mid-fed and the second microwave resonance sensor 304 may be edge fed.

A gas volume fraction of the multiphase fluid "F" may undergo extreme variations, e.g., between 0 and 95% in the operation of a multiphase flowmeter. The fluid "F" may be in a gas-continuous phase where the gas forms a continuous path for electrical signals from one end of the sensor 302, 304 to the other end while the liquid phase of the fluid "F" that includes an oil component and a water component, is dispersed inside the gas phase. The fluid "F" may also be in a liquid-continuous phase where liquid forms the continuous path for the electrical signals from one end of the sensor 302, 304 to another while the gas particles may be dispersed inside the liquid. The liquid-continuous phase may be divided further into a water-continuous phase (indicating a higher water cut (WC) typically in the range of 40-100%) and an oil-continuous phase (indicating a lower water cut (WC) typically in the range of 0-40%. In the water-continuous phase in particular, it has been found that a dielectric resonator response may be non-monotonous as the GVF varies. For example, a resonant frequency ($f_r$) and a quality factor ($Q_r$) measured by the microwave resonance sensors 302, 304 may be indicative of more than one GVF and/or WC combination. The feeding arrangement illustrated in FIG. 5 allows for a unique GVF and WC to be determined from the resonance sensor measurements taken by the microwave resonance sensors 302, 304.

Figure 6A:
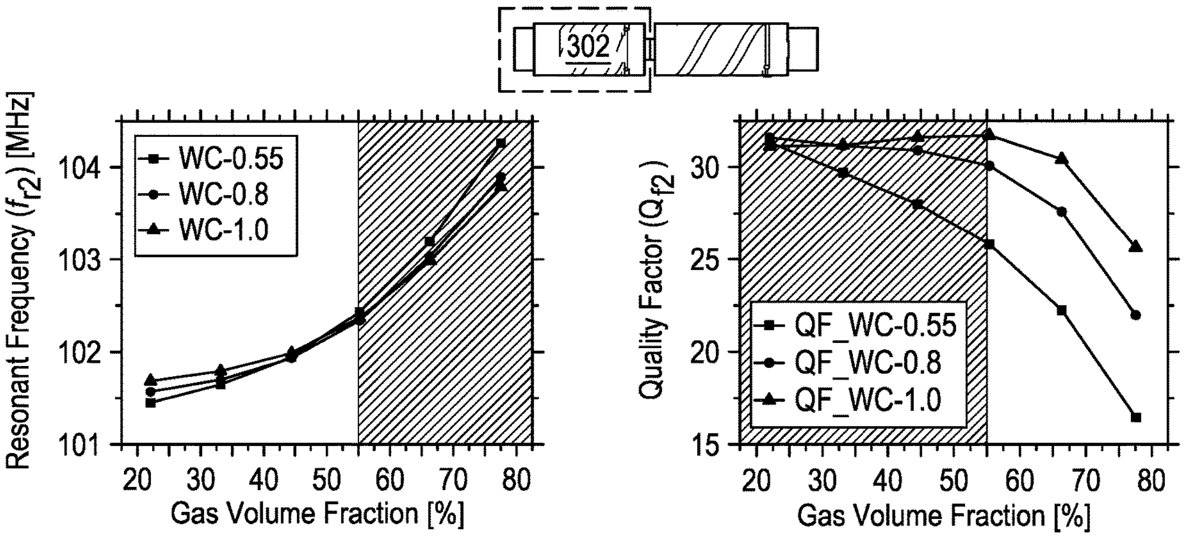
FIGS. 6A and 6B are graphical views of resonant frequency and quality factor responses for a flowmeter including the inserts of FIG. 5 illustrating a monotonous response over selected ranges from which a unique solution for a gas volume fraction of a fluid under test may be determined.
Figure 6B:
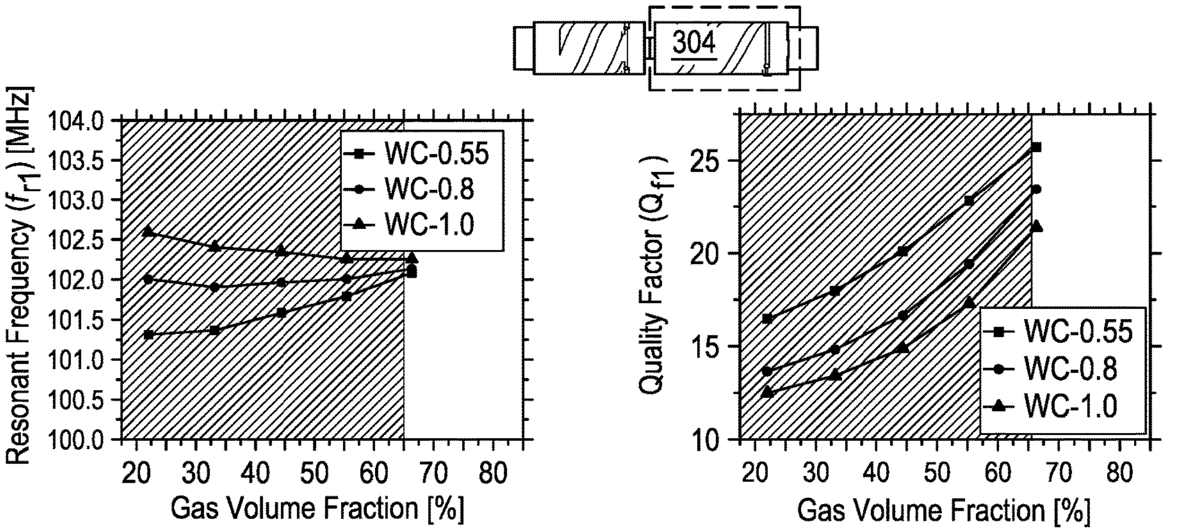

FIG. 6A illustrates a resonant frequency ($f_{r1}$) and quality factor ($Q_{r1}$) for the first microwave resonance sensor 302 (a longer, low frequency spiral resonator) and FIG. 6B illustrates a resonant frequency ($f_{r2}$) and quality factor ($Q_{r2}$) for the second microwave resonance sensor 304 (a shorter, high frequency spiral resonator) using the feeding arrangement of FIG. 5. The resonant frequencies ($f_{r1}$, $f_{r2}$) and quality factors ($Q_{r1}$, $Q_{r2}$) were simulated using FEA (Finite Element Analysis) for multiple water cut fluids "F" over a range of gas volume fractions. As illustrated in FIG. 6A, the resonant frequency ($f_{r1}$) and quality factor ($Q_{r1}$) curves for each water cut measured do not coincide with one another over the range of 0% to 55% gas volume fractions. Thus a unique-solution inverse measurement look-up table may be generated for estimating the WC and GVF of a multiphase fluid "F" by utilizing resonant frequency ($f_{r1}$) and quality factor ($Q_{r1}$) measurements from the first microwave resonance sensor 302. As illustrated in FIG. 6B, the quality factor ($Q_{r2}$) curves do not coincide with one another over the range of 55% to 90% gas volume fractions. Thus a unique-solution inverse measurement look-up table may be generated for estimating the WC and GVF of a multiphase fluid "F" by utilizing quality factor ($Q_{r2}$) measurements from at least the second microwave resonance sensor 304.

Figure 7A:
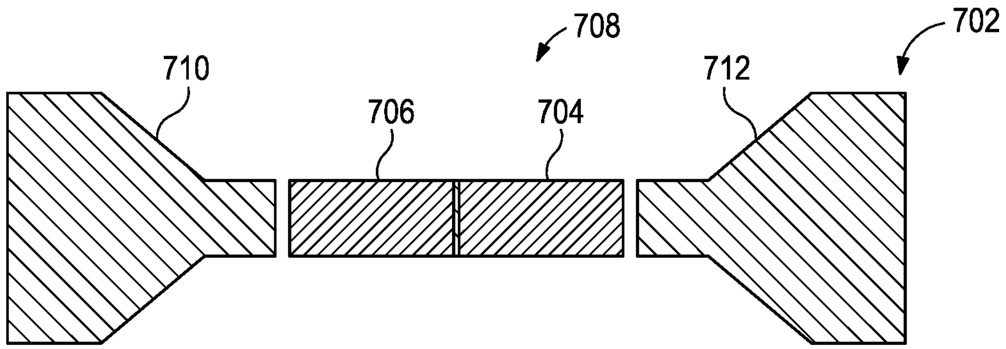
FIGS. 7A through 7C are schematic views of various arrangements of microwave resonance sensors with respect to converging and diverging portions of a Waventuri flowmeter.
Figure 7B:
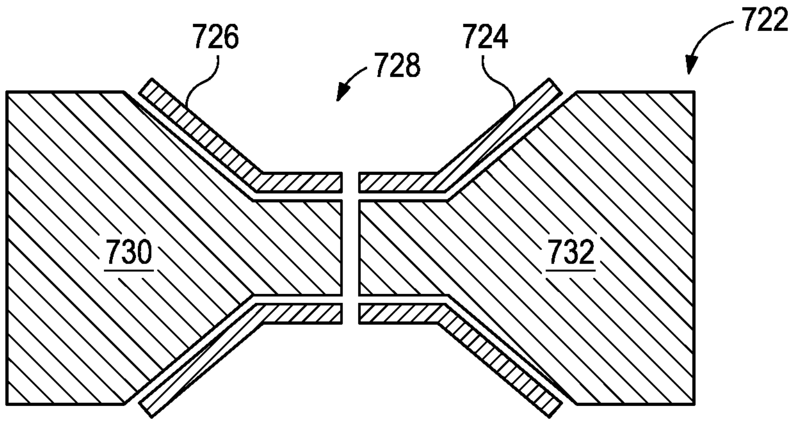
Figure 7C:
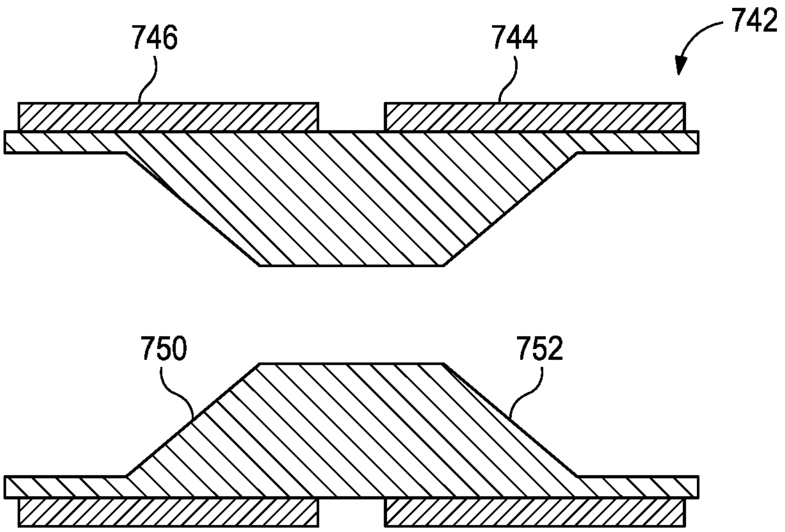

FIGS. 7A through 7C are schematic views of various arrangements of microwave resonance sensors with respect to converging and diverging portions of a Waventuri flowmeters in accordance with various aspects of the present disclosure. FIG. 7A illustrates a flowmeter 702 with first and second microwave resonance sensors 704, 706 (or other permittivity sensors) installed around a throat 708 between a converging section 710 and diverging section 712 of the flowmeter 702. The flow meter 702 is arranged as a conventional Venturi structure where an outer diameter of the flow meter 702 varies over the length of the converging and diverging sections 710, 712. Positioning the microwave resonance sensors 704, 706 may increase an overall length of the flowmeter 702. FIG. 7B illustrates another conventional Venturi structure flowmeter 722 with first and second microwave resonance sensors 724, 726 (or other permittivity sensors) installed around a throat 728 and a converging section 730 or diverging section 732 of the flowmeter 722. The placement of the microwave resonance sensors 724, 726 may allow for an overall length of the flowmeter 722 to be reduced, but may complicate the 3D printing or installation of the microwave resonance sensors 724, 726 on flow meter 722.

FIG. 7C is illustrates an inverted-style flowmeter 742 with first and second microwave resonance sensors 744, 746 (or other permittivity sensors) installed around a converging section 750 and diverging section 752 of the flowmeter 742. The flowmeter 742 is arranged in the inverted-style of flowmeters 150 (FIG. 2A), 220 (FIG. 2B) and 300 (FIG. 3) described above. The Waventuri flowmeter 742 is also arranged with a single piece dielectric insert, similar to the flowmeter 220 (FIG. 2B) described above. This arrangement may allow for a compact multiphase flowmeter 742, which may allow for multiphase fractions to be determined over a full range of gas volume fractions.

Figure 8:
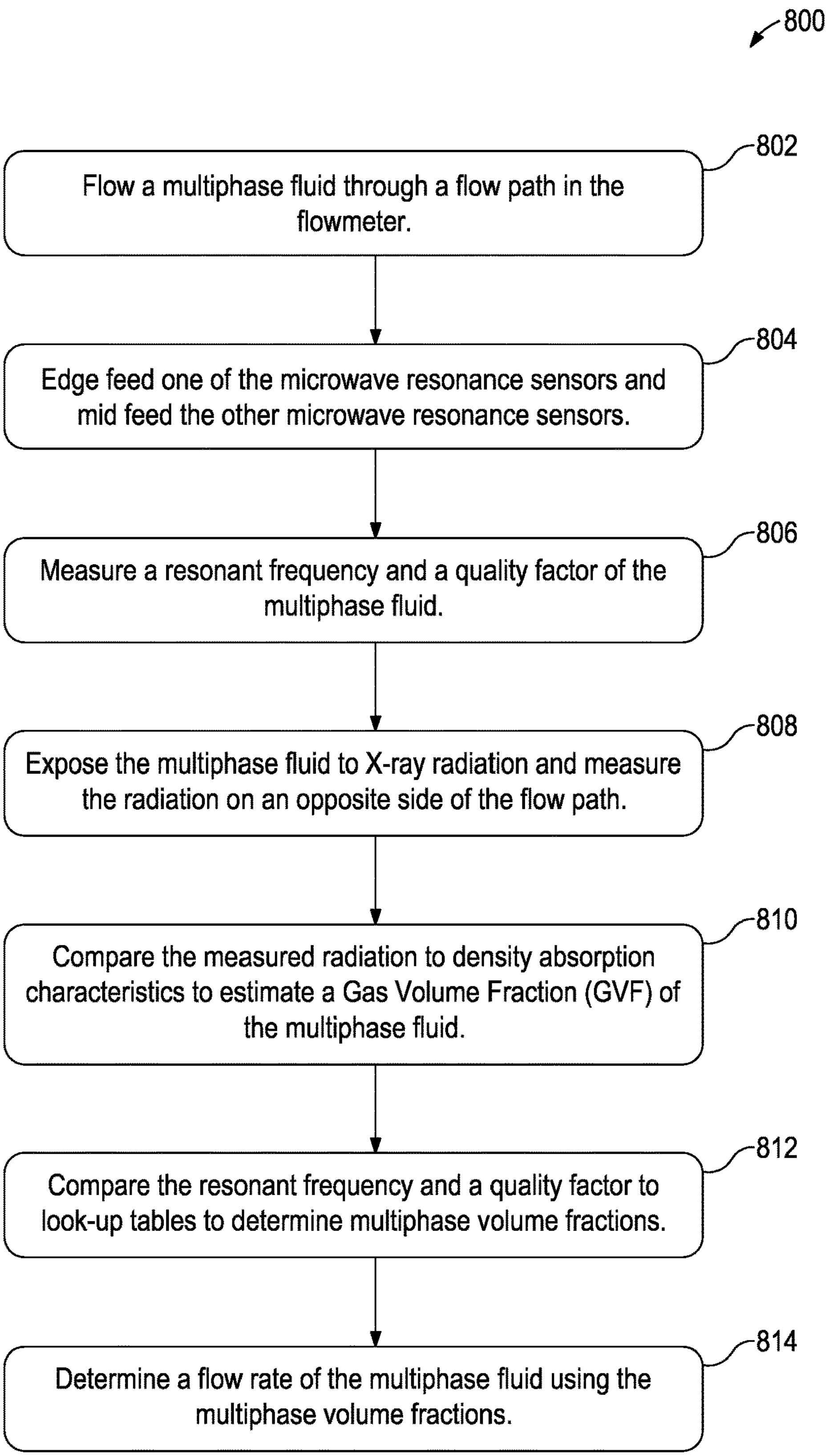
FIG. 8 is a flowchart illustrating an example procedure for measuring a multiphase fluid flow with a Waventuri flowmeter with an integrated multiphase fraction measurement device in accordance with one or more aspects of the present disclosure

FIG. 8 is a flowchart illustrating an example procedure 800 for measuring a multiphase fluid flow with a Waventuri flowmeter with an integrated multiphase fraction measurement device in accordance with one or more aspects of the present disclosure. The procedure 800 begins at step 802 where a multiphase fluid is flowed through the flowmeter. In some embodiments, the flowmeter may be coupled in a downhole wellbore conduit or a surface conduit extending from a wellhead such that the multiphase fluid is a wellbore fluid. In other embodiments, the flowmeter may be coupled in a GOSP or other facility where multiphase flow measurements may be necessary.

Next, at step 804, first and second microwave resonance sensors may be fed with microwave energy. One of the microwave resonance sensors may be edge fed where a wall thickness interposing the sensor and the multiphase fluid is relatively small. The other microwave resonance sensor may be mid-fed where a wall thickness interposing the sensor and the multiphase fluid is relatively large. Each of the microwave resonance sensors may extend axially along a converging or diverging portion of the flowmeter where the wall thickness increases or decreases along an axial direction. At step 806, quality factor and a resonant frequency measurements may be taken by both of the microwave resonance sensors.

At step 808, the multiphase fluid may be exposed with X-ray radiation, e.g., from an X-ray source on a first circumferential side of a flow path through the Waventuri flow meter. A detector array on an opposite circumferential side of the flow path may measure the radiation passing through the multiphase fluid. At step 810, the measured X-ray radiation may be compared with density absorption characteristics of the multiphase fluid to estimate the Gas Volume Fraction (GVF) of the multiphase fluid, for example with a controller operably coupled to the X-ray source and detector array.

At step 812, the resonant frequency and a quality factor measurements may be compared predetermined values tabulated within look-up tables. The comparison may be made by a controller operably coupled to the microwave resonance sensors. From the look-up tables, multiphase volume fractions of the multiphase fluid may be determined. At least due to the arrangement of the microwave resonance sensors along a varying wall thickness and the feeding arrangement of the microwave resonance sensors, a unique solution for the gas volume fraction (GVF), water cut (WC) or other multiphase volume fraction may be available. Using the multiphase volume fraction determined, a flow rate for the multiphase fluid may be accurately determined in step 814. The multiphase volume fraction, together with readings from inlet and throat pressure sensors may be used to determine the flow rate of the multiphase fluid.

Embodiments disclosed herein include:

A. A flowmeter can include an inlet for receiving a wellbore fluid into the flowmeter, the inlet defining an inlet diameter and an outlet for discharging the wellbore fluid from the flowmeter, the outlet defining an outlet diameter. The flowmeter may further include a flow path extending between the inlet and the outlet along a longitudinal flow axis, the flow path including a converging section downstream of the inlet and narrowing from the inlet diameter to a throat diameter, and a diverging section downstream of the converging section and widening from the throat diameter to the outlet diameter. At least one sensor can be operable to detect a parameter indicative of the pressures of the wellbore fluid at the inlet diameter and at the throat diameter and first and second permittivity sensors can extend axially along the diverging and converging sections, respectively. The first and second permittivity sensors can be operable to measure parameters indicative of multiphase volume fractions of the wellbore fluid within the diverging and converging sections.

B. A wellbore system can include a wellbore conduit fluidly coupled to a wellbore and operable to receive a wellbore fluid therein and a flowmeter fluidly coupled to the wellbore conduit. The flowmeter can include an inlet for receiving the wellbore fluid into the flowmeter from the wellbore conduit, the inlet defining an inlet diameter, an outlet for discharging the wellbore fluid from the flowmeter into the wellbore conduit, the outlet defining an outlet diameter and a flow path extending between the inlet and the outlet along a longitudinal flow axis, the flow path including a converging section downstream of the inlet and narrowing from the inlet diameter to a throat diameter, and a diverging section downstream of the converging section and widening from the throat diameter to the outlet diameter. The flowmeter can further include at least one sensor operable to detect a parameter indicative of the pressures of the wellbore fluid at the inlet diameter and at the throat diameter and first and second permittivity sensors extending axially along the diverging and converging sections, respectively, the first and second permittivity sensors operable to measure parameters indicative of multiphase volume fractions of the wellbore fluid within the diverging and converging sections.

C. A method for measuring a flow of a wellbore fluid can include (a) receiving the wellbore fluid at an inlet of a flowmeter, (b) flowing the wellbore fluid through a flow path extending along a longitudinal flow axis through the flowmeter, the flow path including a converging section downstream of the inlet and narrowing from an inlet diameter to a throat diameter, and a diverging section downstream of the converging section and widening from the throat diameter to an outlet diameter, (c) measuring parameters indicative of multiphase volume fractions of the wellbore fluid within the diverging and converging sections with first and second permittivity sensors extending axially along the diverging and converging sections (d) comparing the parameters indicative of multiphase volume fractions to predetermined values tabulated within look-up tables to determine a multiphase volume fraction and (e) determining a flow rate for the wellbore fluid from the multiphase volume fraction.

Each of embodiments A, B, and C may have one or more of the following additional elements in any combination: Element 1: wherein the first and second permittivity sensors are mutually orthogonal microwave resonance sensors. Element 2: wherein the first and second permittivity sensors each include a connector for microwave resonance feed lines at a downstream end thereof such that the first permittivity sensor may be fed from a downstream edge of the flowmeter and the first permittivity sensor may be fed from a midsection of the flowmeter. Element 3: wherein the first and second permittivity sensors extend helically from the connector in an upstream direction around the diverging and converging sections. Element 4: wherein the diverging and converging sections are arranged as an inverted Venturi structure such that a wall thickness of the diverging and converging sections varies in an axial direction and wherein the first and second permittivity sensors extend axially at a generally constant distance from the flow axis along the diverging and converging sections. Element 5: wherein the first and second permittivity sensors are operable to measure a resonant frequency and a quality factor of the wellbore fluid. Element 6: wherein the first and second permittivity sensors extending axially along the diverging section and the converging section have differing axial lengths and differing operating frequency bands. Element 7: further comprising an outer housing defining the inlet and the outlet, and first and second dielectric inserts within the outer housing defining the diverging and converging sections, and wherein the first and second permittivity sensors are disposed radially between the dielectric sensors and the outer housing. Element 8: wherein the first and second dielectric inserts are constructed from a PEEK material having a wall thickness that varies in an axial direction, and wherein the first and second permittivity sensors are disposed along a generally constant outer diameters of the inserts. Element 9: further comprising an X-ray source operable to provide X-ray radiation and an X-ray detector array operable to measure the X-ray radiation, the X-ray source and X-ray detector array disposed on opposite circumferential sides of the flow path such that a first portion of the X-ray radiation passes through flow path and is measured by the X-ray detector array and a second portion of the X-ray radiation passes directly from the X-ray source to the X-ray detector array.

Element 10: wherein the wellbore conduit includes a surface conduit extending from a wellhead disposed over the wellbore. Element 11: wherein the wellbore conduit includes a downhole completion string having one or more inflow control devices therein for receiving the wellbore fluid from a geologic formation around the wellbore. Element 12: further comprising a controller operatively coupled to the first and second permittivity sensors to receive the parameters indicative of multiphase volume fractions and to compare the parameters indicative of multiphase volume fractions to predetermined values tabulated within look-up tables to determine the multiphase volume fraction. Element 13: wherein the first and second permittivity sensors are mutually orthogonal microwave resonance sensors arranged in a helix around dielectric inserts defining the diverging and converging sections. Element 14: wherein the dielectric inserts have a generally constant outer diameter over an axial length of the dielectric inserts, and wherein the dielectric inserts define a varying wall thickness along the diverging and converging sections. Element 15: wherein the first permittivity sensor is edge fed from a connector where the wall thickness is at a minimum and the second permittivity sensor is mid-fed at a connectors where the wall thickness is greatest in the inserts.

Element 16: further comprising detecting a parameter indicative of pressures of the wellbore fluid at the inlet diameter and at the throat diameter. Element 17: further comprising edge feeding the first permittivity sensor from a connector where a wall thickness interposing the first permittivity sensor and the wellbore fluid is at a minimum along the flow path and mid-feeding the second permittivity sensor from a connector where a where a wall thickness interposing the second permittivity sensor and the wellbore fluid is greatest along the flow path.

By way of non-limiting example, exemplary combinations applicable to A, B, and C include: Element 1 with Element 2; Element 2 with Element 3; Element 7 with Element 8; Element 13 with Element 14; and Element 14 with Element 15.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A flowmeter, comprising:

an inlet for receiving a wellbore fluid into the flowmeter, the inlet defining an inlet diameter;

an outlet for discharging the wellbore fluid from the flowmeter, the outlet defining an outlet diameter;

a flow path extending between the inlet and the outlet along a longitudinal flow axis, the flow path including a converging section downstream of the inlet and narrowing from the inlet diameter to a throat diameter, and a diverging section downstream of the converging section and widening from the throat diameter to the outlet diameter;

at least one sensor operable to detect a parameter indicative of the pressures of the wellbore fluid at the inlet diameter and at the throat diameter; and first and second permittivity sensors extending axially along the diverging and converging sections, respectively, the first and second permittivity sensors being operable to measure parameters indicative of multiphase volume fractions of the wellbore fluid within the diverging and converging sections, wherein the diverging and converging sections are arranged as an inverted Venturi structure such that a wall thickness of the diverging and converging sections varies in an axial direction and wherein the first and second permittivity sensors extend axially at a constant distance from the flow axis along the diverging and converging sections.

2. The flowmeter of claim 1, wherein the first and second permittivity sensors are mutually orthogonal microwave resonance sensors.

3. The flowmeter of claim 2, wherein the first and second permittivity sensors each include a connector for microwave resonance feed lines at a downstream end thereof such that the first permittivity sensor is fed from a downstream edge of the flowmeter and the first permittivity sensor may be is fed from a midsection of the flowmeter.

4. The flowmeter of claim 3, wherein the first and second permittivity sensors extend helically from the connector in an upstream direction around the diverging and converging sections.

5. The flowmeter of claim 1, wherein the first and second permittivity sensors are operable to measure a resonant frequency and a quality factor of the wellbore fluid.

6. The flowmeter of claim 1, wherein the first and second permittivity sensors extending axially along the diverging section and the converging section have differing axial lengths and differing operating frequency bands.

7. The flowmeter of claim 1, further comprising an outer housing defining the inlet and the outlet, and first and second dielectric inserts within the outer housing defining the diverging and converging sections, and wherein the first and second permittivity sensors are disposed radially between the dielectric sensors and the outer housing.

8. The flowmeter of claim 7, wherein the first and second dielectric inserts are constructed from a PEEK material having a wall thickness that varies in an axial direction, and wherein the first and second permittivity sensors are disposed along a constant outer diameter of the inserts.

9. The flowmeter of claim 1, further comprising an X-ray source operable to provide X-ray radiation and an X-ray detector array operable to measure the X-ray radiation, the X-ray source and X-ray detector array being disposed on opposite circumferential sides of the flow path such that a first portion of the X-ray radiation passes through flow path and is measured by the X-ray detector array and a second portion of the X-ray radiation passes directly from the X-ray source to the X-ray detector array.

10. The flowmeter of claim 1, wherein the first permittivity sensor includes a connector positioned at a location where a wall thickness between the first permittivity sensor and the flow path is at a minimum along the diverging section, and the second permittivity sensor includes a connector positioned at a location where a wall thickness between the second permittivity sensor and the flow path is greatest along the converging section.

11. A wellbore system, comprising:

a wellbore conduit fluidly coupled to a wellbore and operable to receive a wellbore fluid therein; and a flowmeter fluidly coupled to the wellbore conduit, the flowmeter comprising:

an inlet for receiving the wellbore fluid into the flowmeter from the wellbore conduit, the inlet defining an inlet diameter;

an outlet for discharging the wellbore fluid from the flowmeter into the wellbore conduit, the outlet defining an outlet diameter;

a flow path extending between the inlet and the outlet along a longitudinal flow axis, the flow path including a converging section downstream of the inlet and narrowing from the inlet diameter to a throat diameter, and a diverging section downstream of the converging section and widening from the throat diameter to the outlet diameter;

at least one sensor operable to detect a parameter indicative of the pressures of the wellbore fluid at the inlet diameter and at the throat diameter; and first and second permittivity sensors, the first permittivity sensor extending axially along the diverging section where the flow path diameter increases from the throat diameter toward the outlet diameter, and the second permittivity sensor extending axially along the converging section where the flow path diameter decreases from the inlet diameter toward the throat diameter, the first and second permittivity sensors being operable to measure parameters indicative of multiphase volume fractions of the wellbore fluid within the diverging and converging sections.

12. The wellbore system of claim 11, wherein the wellbore conduit includes a surface conduit extending from a wellhead disposed over the wellbore.

13. The wellbore system of claim 11, wherein the wellbore conduit includes a downhole completion string having one or more inflow control devices therein for receiving the wellbore fluid from a geologic formation around the wellbore.

14. The wellbore system of claim 11, further comprising a controller operatively coupled to the first and second permittivity sensors to receive the parameters indicative of multiphase volume fractions and to compare the parameters indicative of multiphase volume fractions to predetermined values tabulated within look-up tables to determine the multiphase volume fraction.

15. The wellbore system of claim 11, wherein the first and second permittivity sensors are mutually orthogonal microwave resonance sensors arranged in a helix around dielectric inserts defining the diverging and converging sections.

16. The wellbore system of claim 15, wherein the dielectric inserts have a constant outer diameter over an axial length of the dielectric inserts, and wherein the dielectric inserts define a varying wall thickness along the diverging and converging sections.

17. The wellbore system of claim 16, wherein the first permittivity sensor is edge fed from a connector where the wall thickness is at a minimum and the second permittivity sensor is mid-fed from a connector where the wall thickness is greatest in the inserts.

18. A method for measuring a flow of a wellbore fluid, the method comprising:

receiving the wellbore fluid at an inlet of a flowmeter;

flowing the wellbore fluid through a flow path extending along a longitudinal flow axis through the flowmeter, the flow path including a converging section downstream of the inlet and narrowing from an inlet diameter to a throat diameter, and a diverging section downstream of the converging section and widening from the throat diameter to an outlet diameter;

measuring parameters indicative of multiphase volume fractions of the wellbore fluid within the diverging and converging sections with first and second permittivity sensors extending axially along the diverging and converging sections, respectively, the first permittivity sensor extending axially along the diverging section where the flow path diameter increases from the throat diameter toward the outlet diameter, and the second permittivity sensor extending axially along the converging section where the flow path diameter decreases from the inlet diameter toward the throat diameter;

comparing the parameters indicative of multiphase volume fractions to predetermined values tabulated within look-up tables to determine a multiphase volume fraction; and determining a flow rate for the wellbore fluid from the multiphase volume fraction.

19. The method of claim 18, further comprising detecting a parameter indicative of pressures of the wellbore fluid at the inlet diameter and at the throat diameter.

20. The method of claim 18, further comprising edge feeding the first permittivity sensor from a connector where a wall thickness interposing the first permittivity sensor and the wellbore fluid is at a minimum along the flow path and mid-feeding the second permittivity sensor from a connector where a where a wall thickness interposing the second permittivity sensor and the wellbore fluid is greatest along the flow path.

* * * * *